Sept. 4, 1962  H. EPSTEIN ET AL  3,052,009
APPARATUS FOR THE CRIMPING OF SYNTHETIC
FIBERS BY ELECTROSTATIC MEANS
Filed July 11, 1960  2 Sheets-Sheet 1
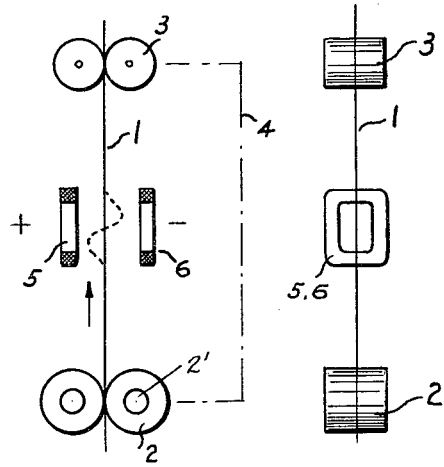
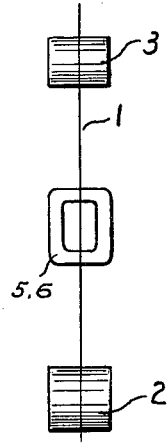
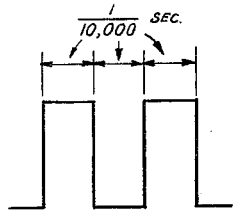
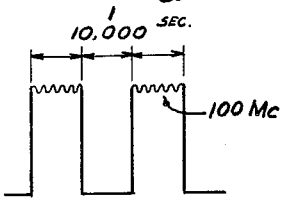
FIG. 1   FIG. 2   FIG. 3a   FIG. 3b
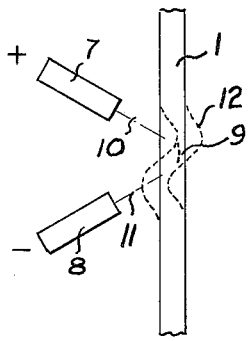
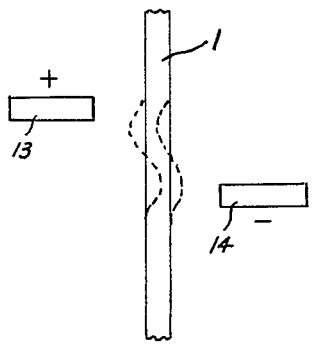
FIG. 4   FIG. 5
FIG. 9
INVENTOR.
HERMAN EPSTEIN & EDWARD J. EPSTEIN
BY Sept. 4, 1962 H. EPSTEIN ET AL 3,052,009
APPARATUS FOR THE CRIMPING OF SYNTHETIC
FIBERS BY ELECTROSTATIC MEANS
Filed July 11, 1960 2 Sheets-Sheet 2

INVENTOR.
HERMAN EPSTEIN & EDWARD J EPSTEIN
BY
Theodore [signature]
ATTY 3,052,009
APPARATUS FOR THE CRIMPING OF SYNTHETIC FIBERS BY ELECTROSTATIC MEANS
Herman Epstein and Edward J. Epstein, Newark, N.J., assignors to Colorspace Patent Associates, Newark, N.J., a partnership
Filed July 11, 1960, Ser. No. 41,893
3 Claims. (Cl. 28—1)

This invention relates to the crimping of synthetic fibers, especially of thermoplastic fibers, or filaments of the continuous or endless type.

One of the objects of the invention is to improve crimping and, more specifically, to homogenize crimping dimensions and quality by producing crimps through the application of a field or fields of predeterminedly-shaped, unilateral shocks or pulses.

A more specific object of the invention is to produce crimps along a continuously running strand or filament of synthetic fiber consisting substantially of electrically insulating thermoplastic material, such as Nylon 6 or Nylon 66, exposing the filament intermittently at a repetition frequency, depending upon speed and structure of the filament, to an electromagnetic field pulse of predetermined intensity and duration.

The field pulse may be of a pure direct current character or, preferably, carry a frequency modulation which is high compared to the repetition frequency of the field pulses thus applied.

According to another object of the invention, predeterminedly shaped shock pulses may be applied in the form of supersonic waves of a predetermined repetition rate and also carrying, if required, a frequency modulation which is very high against the repetition rate of the shock pulses themselves.

In a preferred embodiment of the invention, the frequency modulation of the pulses, as distinguished from its repetition rate, is of such an order of magnitude as to produce, when applied to the structure of the continuously running filament which, if necessary, has been prepared therefor by an appropriate impregnation or coating, a heating or softening effect at the points of, and substantially simultaneously with, the crimping deformation caused by the pulses themselves.

These and other objects of the invention will be more fully apparent from the drawings annexed herewith in which FIGS. 1 and 2, in front and side elevations respectively, show in schematical form a device for producing crimping by the application of electrostatic field pulses of a shape schematically illustrated in FIGS. 3a and 3b.

FIGS. 4 and 5 show modifications of an electrode system, also for the application of electrostatic field pulses.

FIG. 9 illustrates a crimped filament after treatment in accordance with the invention.

Figure 6:
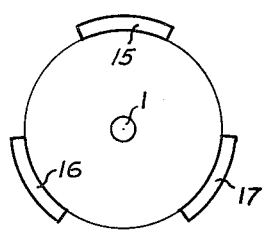
FIGS. 6, 7, 8 represent another electro system exemplifying the invention.

In FIG. 1 a Nylon 6 filament 1 of a diameter 60 to 120 denier is shown to run in a substantially vertical or upward direction from between a pair of take-off rollers 2 at a speed of 10 feet/second to a pair of take-up rollers 3 to produce crimps of about $\frac{1}{64}$ inch length and spaced by about $\frac{1}{64}$ inch.

There is no necessity to arrange take-up rollers 3 on top of take-off rollers 2, although it may be a preferred embodiment of the invention by arranging the two pair of driving rollers in the manners shown in FIG. 1, in order to make use of certain properties of the nylon as a result of its inertia or gravity.

While take-up rollers 3 are driven in a continuous manner, take-off rollers 2 are coupled to be driven in a discontinuous or intermittent manner to take into account the increasing length caused along filament 1 by the electrical crimping shock applied to filament 1 in its path from take-off rollers 2 to take-up rollers 3.

In order to achieve the variations required in the movement of take-off rollers 2, take-off rollers 2 are driven, or permitted to be driven by an intermediate coupling arranged in the coupling mechanism schematically indicated at 4, intermittently in the rhythm of the crimping steps applied to filament 1 when passing from take-off rollers 2 to take-up rollers 3.

According to another modification of the invention, take-off rollers 2 may be arranged slippable or slidable over shafts or rings 2′ formed of one piece with the shafts so that any shockwise increase in length of filament 1 on its path from take-off rollers 2 to take-up rollers 3 will result in a slippage between elements 2 and 2′ representing a friction coupling without affecting the uniform speed of shafts 2′ and without causing any damage to the filament.

It is also required in accordance with the invention, to maintain filament 1 at the point of crimping under a predetermined tension which, in the present example, was maintaained for a 60 denier filament of Nylon 6 at approximately 10 grams.

In accordance with the invention, crimping or deformation of filament 1 in a direction substantially perpendicular to its longitudinal extension is effected by causing filament 1 to pass between a pair of ring-shaped electrodes 5, 6 to which electric field pulses are applied by a voltage determined by the distance between the electrodes and, therefore, between electrodes and filament and also depending on thickness, speed, tension and electrical and mechanical structure of the filament 1 itself. In the present example of Nylon 6 of 60 denier, the distance between electrodes 5, 6 was maintained at about two inches with a voltage of about 5,000 volts.

As apparent from FIG. 3a, the length of the current pulse was maintained at about $\frac{1}{10000}$ of a second and a distance between two successive field pulses also maintained at $\frac{1}{10000}$ of a second.

In one example of applying the invention, pure D.C. current pulses were applied; in another example of the invention, the pulses consisted of waves modulated by a frequency which is very high against the repetition frequency, preferably of the order of 100 megacycles.

In the latter case, especially with a superficial impregnation or softening of the nylon fiber with water or another humidifying liquid, the crimping was found to be of a more permanent nature due to the improved heating and drying effect caused by the alternating high frequency modulation superimposed upon the D.C. pulses as apparent from FIG. 3b.

As apparent from FIG. 4, electrostatic electrodes may not only be arranged, as in FIGS. 1 and 2, facing each other with the filament to be crimped passing therebetween, but may also be arranged side-by-side in the form of plates or stub-type electrodes or tips 7, 8 arranged at an angle and along which filament 1 is caused to pass from take-off rollers to take-up rollers in a manner similar to that shown in FIG. 1 or in a reversed direction.

Apart from that, electrodes 7, 8 produce a field which is comparatively different from that produced by electrodes 5, 6 according to FIG. 1 and one which is more or less perpendicular or oblique to the extension of filament 1. According to FIG. 4, for a short section 9 the field may be considered to be substantially parallel to the extension of filament 1, while at sections 10 and 11 the field lines may extend in directions substantially perpendicular or oblique to the extension of filament 1 but in directions opposite with respect to each other.

As a result, with the arrangement of FIG. 3, instead of a more unilateral crimp such as derived from an arrangement according to FIG. 1, a bilateral-type crimp is realized which has certain advantages and which permits to achieve a greater softness when applied to certain fibers and in combination with certain speeds and bundling procedures.

Otherwise pulse shapes, repetition rates and modulation frequencies are applied in a manner similar to that shown in FIGS. 3a and 3b, except that it may be required for higher effectiveness to reduce the distance between electrodes 7, 8 to about half an inch and the voltage to about 2,500 volts accompanied by a similar reduction of distance between filament 1 and electrodes 7, 8 to about ⅜ of an inch.

In order to reduce distances and enhance accuracy of crimping dimensions, as apparent from FIG. 4 (which is applicable to all the other embodiments of the invention shown or described), the entire space surrounding the crimping position may be closed in, as schematically indicated by dotted line 12, and evacuated or filled with oil or any other dielectric medium.

Passing a filament of the type shown at 1 through such an enclosure in a gas-tight manner is well-known from high vacuum techniques, as applied for example to the coating by cathode evaporation of plastic tape or filaments, which need not be amplified in detail.

Figure 7:
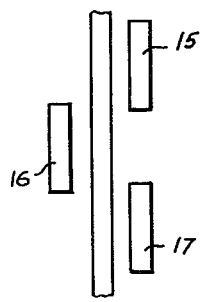

FIG. 5 represents a modified arrangement with electrode tips 13, 14 being disposed staggered but on opposite sides of filament 1. FIGS. 6 and 7 illustrate a circular type of electrode structure with three electrodes 15, 16, 17 arranged symmetrically around, and longitudinally staggered along, filament 1. Similarly, staggered or 120°-phase displaced pulses are applied to electrodes 15, 16 and 17 respectively as apparent from FIG. 8. As a result, helically shaped crimps will be obtained, as illustrated schematically in FIG. 9.

Figure 8:
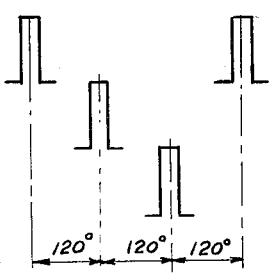

The production and application of electrical pulses of the shape indicated in FIGS. 3a and 3b and FIG. 8, and of any other pulses or pulse shapes appropriate for the invention, are well-known as well as the shaping and arranging of electrodes and electrode systems, which is also familiar to any cathode ray tube engineer.

Figure 10:
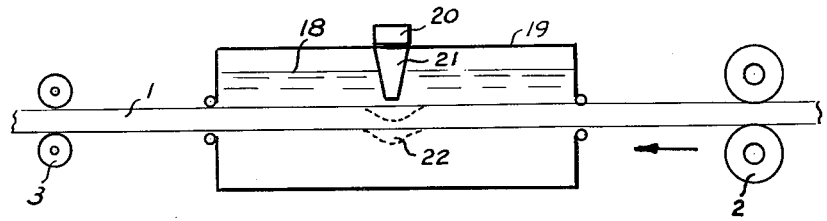
FIGS. 10 to 13 illustrate the invention as applied in the form of supersonic pulses transferred by means of a liquid medium upon a nylon filament running through such medium at predetermined speed.
Figure 11:
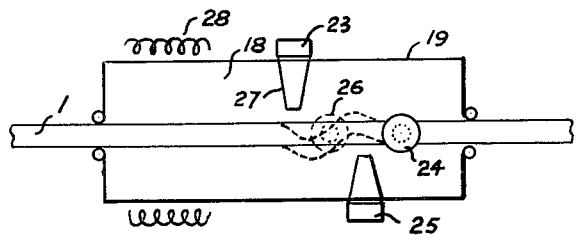

FIGS. 10 and 11 illustrate the use of predeterminedly shaped supersonic shock pulses for the production of crimps along a continuously running filament of Nylon 66 of dimensions similar to those described with respect to FIGS. 1 through 8.

In the case of FIG. 10, filament 1 is run through an oil bath 18 contained in a cylinder or housing 19 and, here again, pairs of take-off rollers and take-up rollers 2, 3 are functioning in a manner similar to that shown in FIGS. 1 and 2.

Housing 19 is provided with one or more piezo electric crystals 20, or other types of electrostatically, electromagnetically or electrodynamically excited electrodes, operating through a focusing cone schematically indicated at 21 on a predetermined section 22 of filament 1.

Figure 12:
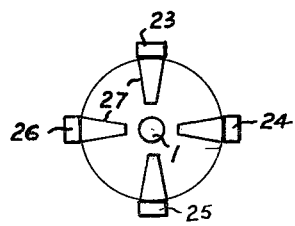

As apparent from FIGS. 11 and 12, housing 19 may be provided with a number of vibrating crystals or electrodes 23 to 26 arranged symmetrically around, and staggered with respect to, filament 1. Crystals 22, or in the case of several crystals, crystals 23 to 26, are excited in otherwise well-known manner by a source or sources of supersonic frequencies and thereby unilateral shock pulses of a duration of about $\frac{1}{10,000}$ of a second, of the same shape as shown in FIGS. 3a and 3b or FIG. 9, are applied through liquid 18 and focusing wires 27 upon a predetermined point or points of filament 1, thereby causing a predetermined deformation or crimp.

By applying to vibrating elements 23 to 26, 90°-phase displaced pulses, instead of a unilateral crimp as produced by a single unilateral supersonic pulse, a spiral or helicoidal crimp will be produced.

Figure 13:
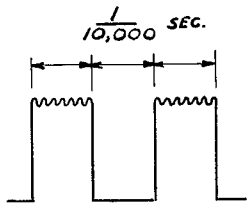

As in the previous cases of electrical field pulses, instead of a pure supersonic field shock of a 10,000 cycle repetition rate, additional supersonic shocks in the form of a still higher frequency modulation may be used to produce additional heating and deformation effects, for example by superimposing upon the 10,000 cycle pulse a frequency modulation of 100,000 to 1,000,000 cycles, of the form for example illustrated in FIG. 13.

In accordance with another modification of the invention, the oil contained in container 19 is maintained electrically heated at a predetermined temperature by means of coils 28 to produce or enhance additional deformation effects, especially for the purpose of acceleration or facilitating crimping and insuring the life or permanency of the cirmps thus obtained.

While the invention has been illustrated with the use of certain electromagnetic or electromechanical vibrations or fields, it is not limited to the use of the fields and electrode systems, frequencies and intensities shown and described but it may be applied in any form or manner whatsoever and to any sort of moving filamentary structure, especially of the thermoplastic type, without departing from the scope of this disclosure.

We claim:

1. In an arrangement for the production of crimps along a continuously running thermoplastic filament, means for driving said filament in longitudinal direction past a predetermined position where the crimp is to be applied; electrode means arranged at least on two sides of said position, and on opposite sides of said filament, and means for applying unilateral pulses to said electrode means to produce a unilateral deformation in the rhythm of said pulses.

2. Arrangement according to claim 1 comprising field conducting means and means for passing said filament at said position through said field conducting means.

3. Arrangement according to claim 2 comprising means for additionally heating said field conducting means.

References Cited in the file of this patent

UNITED STATES PATENTS 2,158,415    Formhals             May 16, 1939